United States Patent
Ciardi

(10) Patent No.: US 7,268,825 B2
(45) Date of Patent: Sep. 11, 2007

(54) DIGITAL SYNCHRONIZING GENERATOR

(75) Inventor: John Joseph Ciardi, Portland, OR (US)

(73) Assignee: Thomson Licensing LLC, Boulonge-Billancourt (FR)

( * ) Notice: Subject to any disclaimer, the term of this patent is extended or adjusted under 35 U.S.C. 154(b) by 809 days.

(21) Appl. No.: 10/761,456

(22) Filed: Jan. 20, 2004

(65) Prior Publication Data

US 2004/0207763 A1    Oct. 21, 2004

Related U.S. Application Data

(60) Provisional application No. 60/459,312, filed on Apr. 1, 2003.

(51) Int. Cl.
   *H04N 5/06* (2006.01)
   *H04N 5/12* (2006.01)

(52) U.S. Cl. .......... 348/512; 348/521; 348/536; 348/537; 348/505; 348/533

(58) Field of Classification Search .......... 348/512, 348/505, 516, 536, 537, 521, 549, 522, 525, 348/533; 375/362, 373, 375, 371; 345/213; 331/20, 25
   See application file for complete search history.

(56) References Cited

U.S. PATENT DOCUMENTS

| | | | | |
|---|---|---|---|---|
| 4,328,513 A | * | 5/1982 | Furihata et al. | 348/505 |
| 4,611,239 A | * | 9/1986 | Shanley, II | 348/505 |
| 4,611,240 A | * | 9/1986 | Harwood | 348/507 |
| 4,797,732 A | * | 1/1989 | Aketagawa et al. | 348/654 |
| 4,819,196 A | * | 4/1989 | Lilley et al. | 708/3 |
| 4,975,767 A | * | 12/1990 | Sorenson | 348/527 |
| 4,989,073 A | * | 1/1991 | Wagner | 348/498 |
| 5,126,854 A | * | 6/1992 | Sano | 386/125 |
| 5,184,091 A | * | 2/1993 | Srivastava | 331/10 |
| 5,459,524 A | * | 10/1995 | Cooper | 348/507 |
| 5,534,939 A | * | 7/1996 | Nakamura et al. | 348/505 |
| 5,539,357 A | * | 7/1996 | Rumreich | 331/17 |
| 5,686,968 A | * | 11/1997 | Ujiie et al. | 348/521 |
| 5,742,191 A | * | 4/1998 | Romesburg et al. | 327/156 |
| 5,845,039 A | * | 12/1998 | Ko et al. | 386/16 |
| 6,028,641 A | * | 2/2000 | Kim | 348/537 |
| 6,037,994 A | * | 3/2000 | Bae | 348/510 |
| 6,137,536 A | * | 10/2000 | Yamaguchi | 348/521 |

(Continued)

*Primary Examiner*—David Ometz
*Assistant Examiner*—Jean W. Désir
(74) *Attorney, Agent, or Firm*—Joseph J. Laks; Robert B. Levy

(57) ABSTRACT

A sync generator (genlock) (10) for frequency and phase locking an incoming video signal to a system clock (12) includes a digitizer (16, 22) for digitizing the incoming video signal to yield a digitized color sub-carrier burst component. A numerically controlled oscillator (15) clocked by the system clock generates a phase lock reference signal for locking to the incoming video signal. Phase detection means logic unit (42, 74) sense a static phase offset magnitude from an ideal 90° phase offset between the digitized color sub-carrier burst component and the numerically controlled oscillator output signal. In accordance with the sensed static offset, a static phase error nulling circuit (70) generates a compensating offset in accordance for input to the system clock (27) to drive the static offset to zero, thus achieving frequency and phase locking. A color frame logic unit (78) determines the color frame sequence for the purpose of resetting the NCO and generating a color frame pulse marking the start of the period sequence.

22 Claims, 11 Drawing Sheets

U.S. PATENT DOCUMENTS

| | | | |
|---|---|---|---|
| 6,151,076 A * | 11/2000 | Hoffman et al. | 348/512 |
| 6,151,479 A * | 11/2000 | Kummer | 725/70 |
| 6,177,959 B1 * | 1/2001 | Bril | 348/521 |
| 6,246,440 B1 * | 6/2001 | Okamoto et al. | 348/505 |
| 6,262,695 B1 * | 7/2001 | McGowan | 345/1.1 |
| 6,271,889 B1 * | 8/2001 | Bohm et al. | 348/531 |
| 6,275,265 B1 * | 8/2001 | Kimura et al. | 348/536 |
| 6,298,100 B1 * | 10/2001 | Bouillet | 375/326 |
| 6,307,594 B1 * | 10/2001 | Yamauchi | 348/512 |
| 6,522,365 B1 * | 2/2003 | Levantovsky et al. | 348/537 |
| 6,532,042 B1 * | 3/2003 | Kim | 348/537 |
| 6,674,482 B1 * | 1/2004 | Park | 348/536 |
| 6,707,503 B1 * | 3/2004 | Naka et al. | 348/537 |
| 6,757,024 B2 * | 6/2004 | Lee | 348/512 |
| 6,765,620 B2 * | 7/2004 | Horita | 348/524 |
| 6,795,124 B1 * | 9/2004 | Gamo et al. | 348/525 |
| 6,917,388 B2 * | 7/2005 | Naka et al. | 348/537 |
| 6,950,150 B2 * | 9/2005 | Purcell et al. | 348/720 |
| 7,002,634 B2 * | 2/2006 | Tai et al. | 348/537 |
| 7,136,109 B2 * | 11/2006 | Alkhalili et al. | 348/537 |
| 2004/0174460 A1 * | 9/2004 | MacInnis | 348/500 |

* cited by examiner

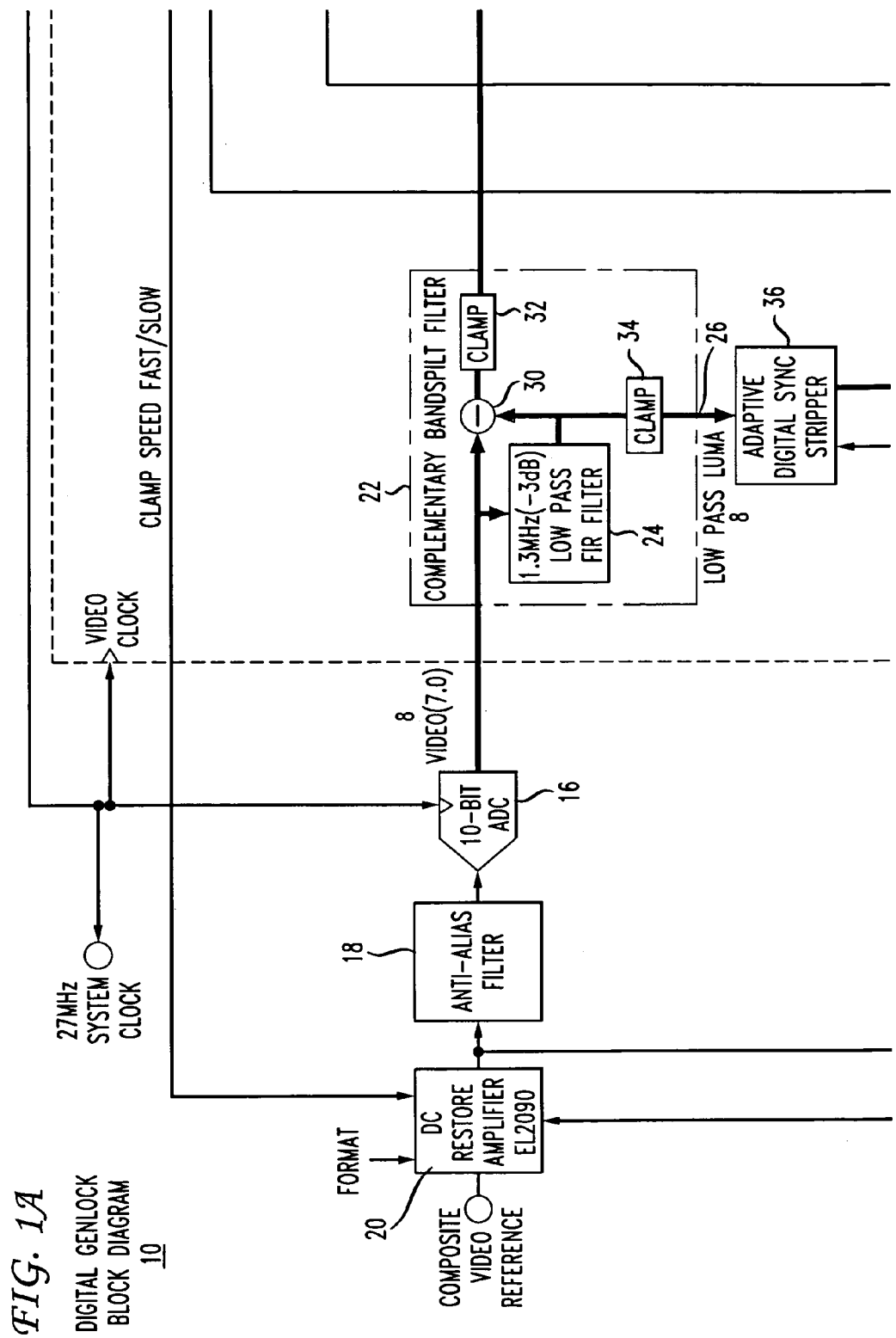

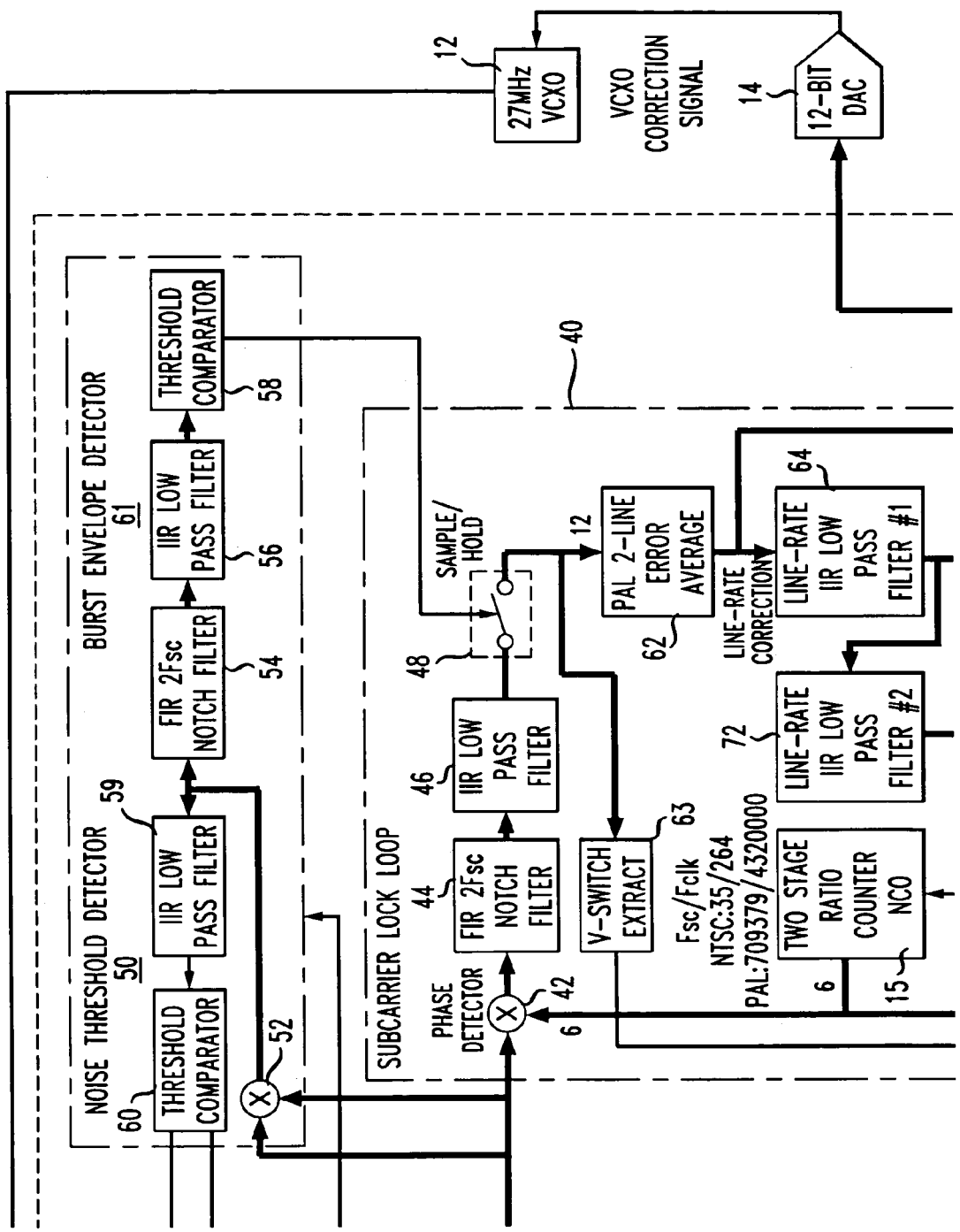

DIGITAL GENLOCK
BLOCK DIAGRAM
10

| *FIG. 1A* | *FIG. 1B* |
|---|---|
| *FIG. 1C* | *FIG. 1D* |

DIGITAL GENLOCK BLOCK DIAGRAM 10

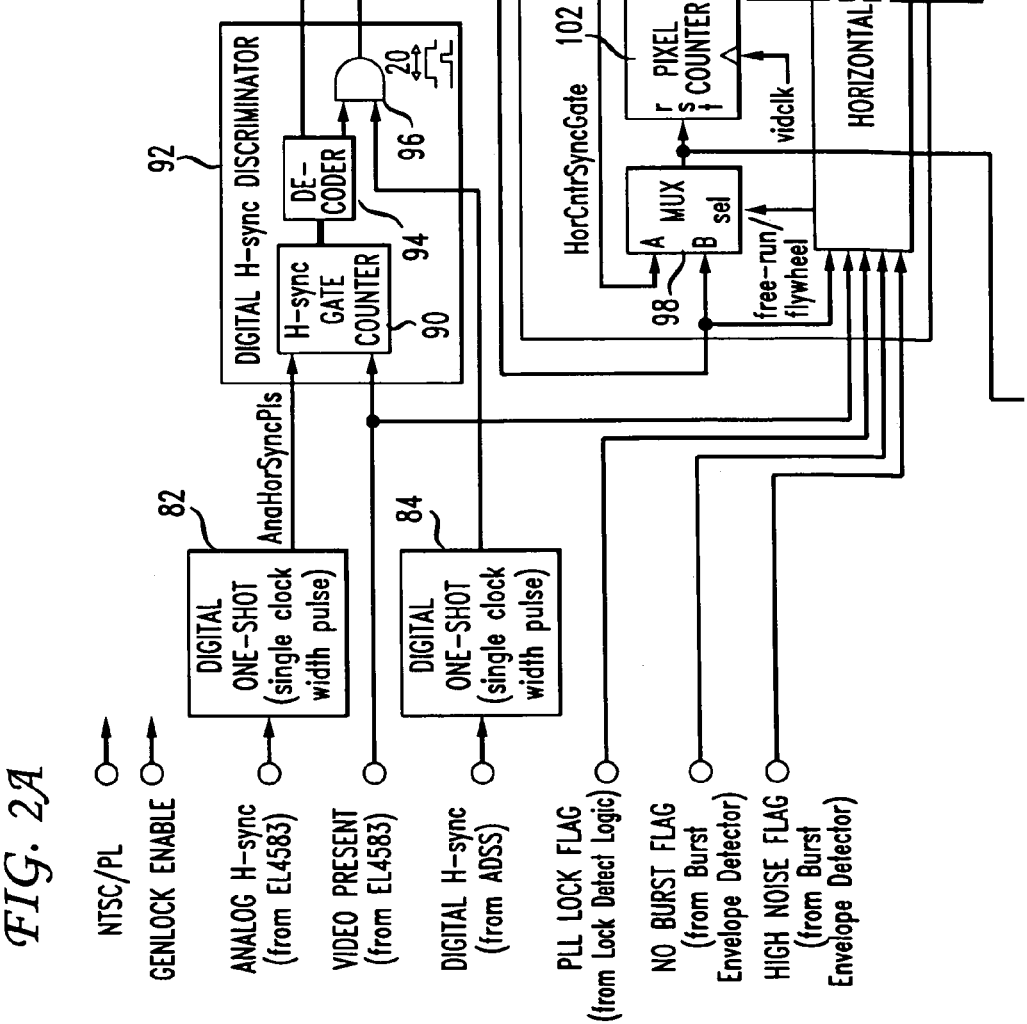

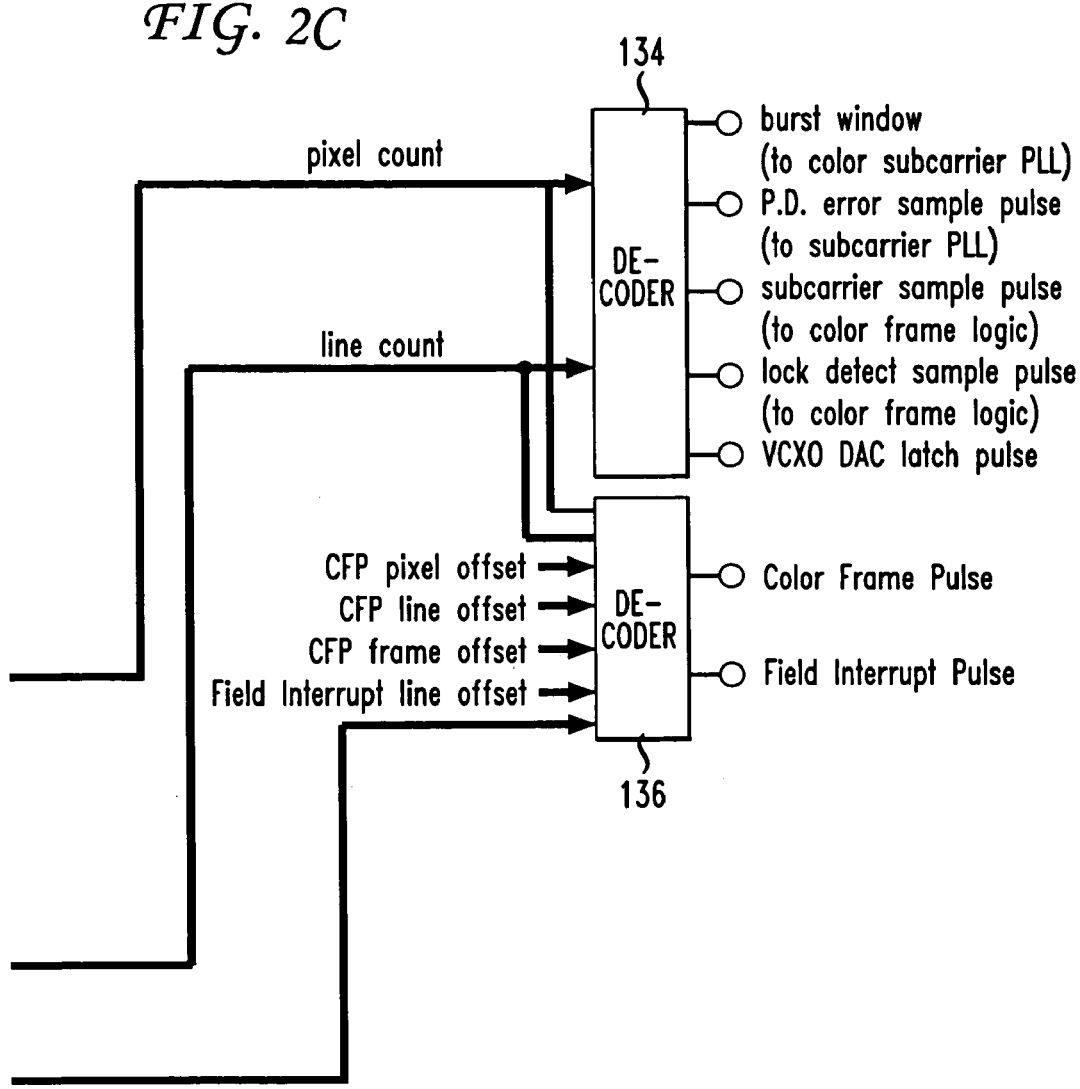

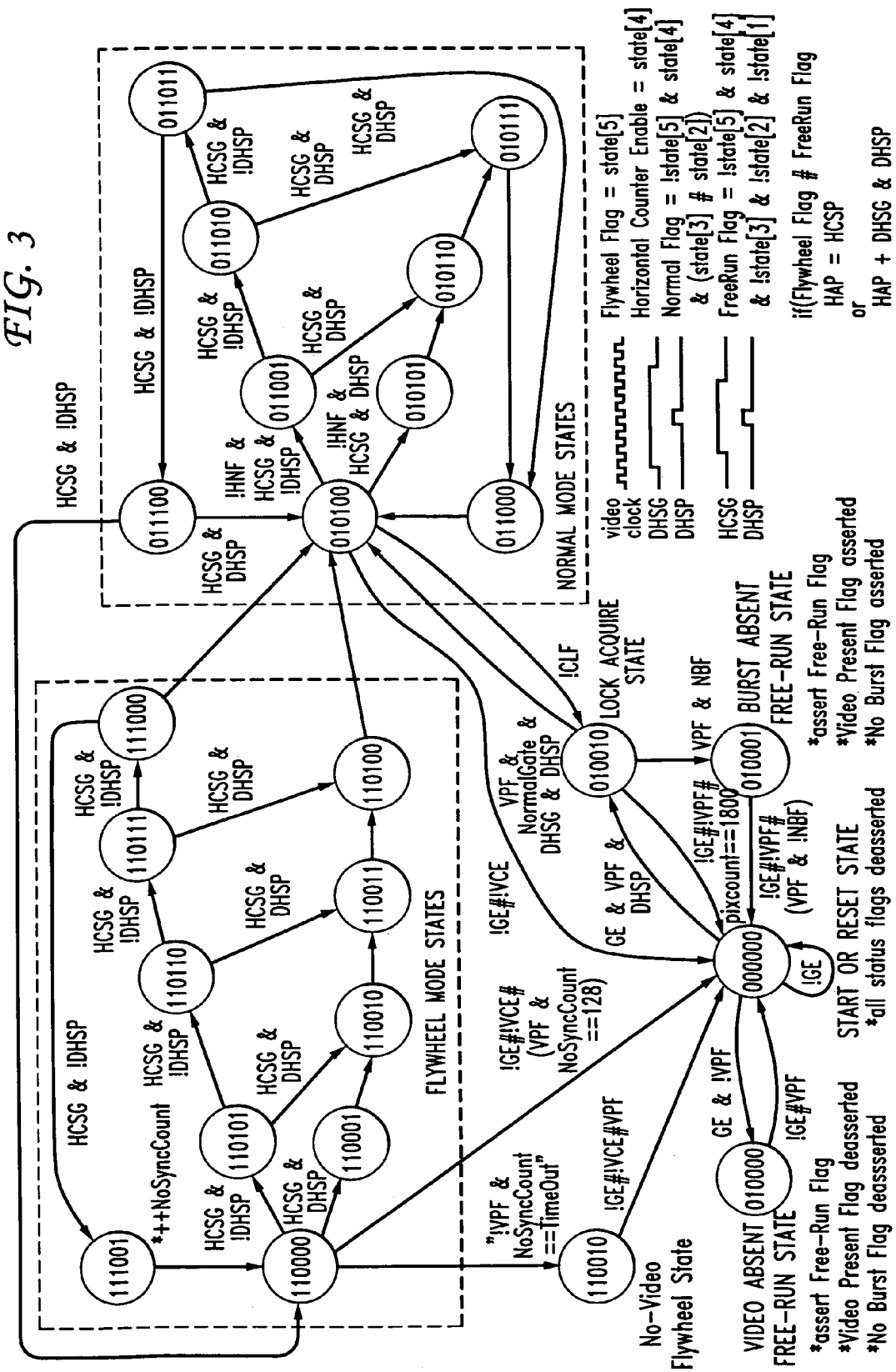

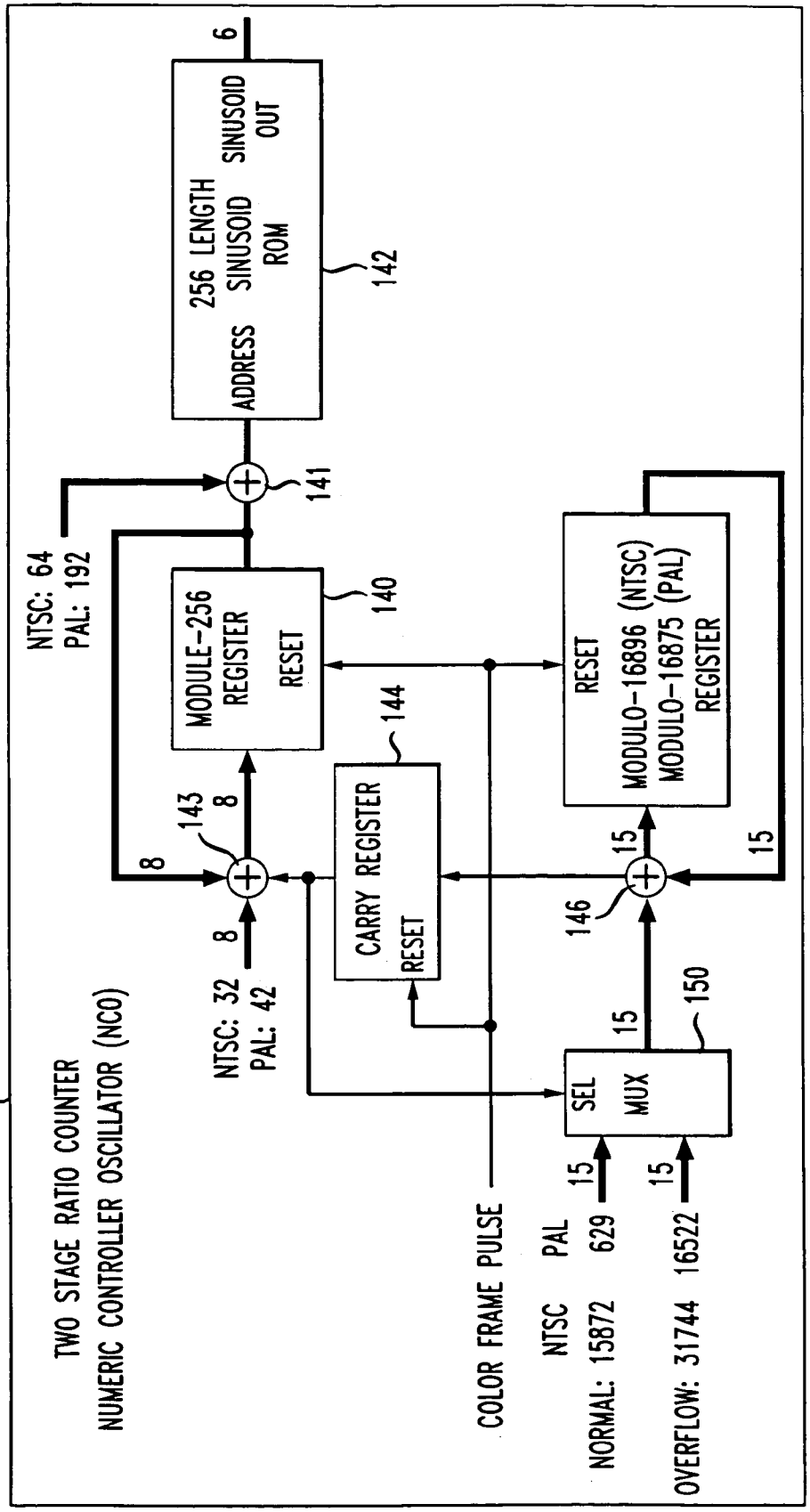

DIGITAL SYNCHRONIZING GENERATOR

CROSS REFERENCE TO RELATED APPLICATION

This application claims priority under 35 U.S.C. 119(e) to U.S. Provisional Patent Application Ser. No. 60/459,312, filed Apr. 1, 2003, the teachings of which are incorporated herein.

TECHNICAL FIELD

This invention relates to a technique for achieving frequency and phase locking of a clock signal to a composite video reference signal.

BACKGROUND ART

The term "genlock" as used in the television industry, represents an abbreviation for the terms "generator locking" and typically refers to synchronizing a video signal to a clock signal of a prescribed frequency. Most if not all video cameras and other sources of video signals have a local oscillator for locking the video signal generated by the device to the local oscillator frequency. However, the local oscillator frequency of one source will not necessarily have the same phase as the local oscillator frequency of another source, even if both local oscillators have same frequency. Such a phase difference can adversely affect the processing of such signals. To achieve synchronism between video sources, a synchronizing (sync) generator provides a common genlock (sync) signal to each video source.

To understand the process of synchronization, some background on video signals will prove helpful. The horizontal blanking interval of an NTSC or PAL composite video waveform contains horizontal synchronization (H-sync) portion and a color sub-carrier burst signal component. The color sub-carrier bust component has 9 or 10 sub carrier cycles, depending on whether the video signal is NTSC or PAL, respectively. A synchronizing signal, typically in the form of a 27 MHz signal generated by a Voltage Controlled Oscillator (VCXO), locks to either the H-sync portion or the burst component of the composite video reference signal. Locking the synchronizing signal to the burst component provides a more stable sync signal (i.e., reduced jitter) as compared to locking to the horizontal sync portion since much more signal "information" resides in the 9 (NTSC) or 10 (PAL) burst sub-carrier cycles than in the falling edge of the H-sync signal. Additionally, locking to the burst component yields a sync signal much less influenced by noise residing on the reference video signal, as compared to locking to the H-sync portion.

Analog sync generators that lock the 27 MHz signal of the VCXO to the burst component of the video signal generally offer superior jitter and noise handling performance. However, the implementation of an analog sync generator requires a large number of commercially available analog components and extensive calibration to guarantee repeatable performance. In addition, color-frame sequencing is difficult to implement in an analog sync generator. In this regard, burst-locked loops utilized in present day analog sync generators typically require more design effort as compared than sync-lock loops, particularly due to the frequency relationship between the color sub carrier frequency and the 27 MHz clock signal. The ratio of the Frequency clock (Fclock) to the Sub-carrier Frequency (Fsubcarrier) for a NTSC video signal is given by Fclock/Fsubcarrier=35/264 while for a PAL video signal, the ratio Fclock/Fsubcarrier is 709379/4320000. For sync locking, the ratios are much more simple, yielding a ratio of Fclock/Fsync=1/1716 for a NTSC video signal and ratio of Fclock/Fsync=1/1728 for a PAL video signal.

Digital sync generators typically synchronize the 27 MHz of the VCXO to the horizontal sync portion of the incoming video signal. As compared to analog sync generators that synchronize the 27 MHz signal of the VCXO to the burst component of the video signal, present day digital sync generators generally offer lower cost implementations. However, the jitter and noise handling performance of present digital sync generators make them inferior to analog sync generators.

Thus, there is need for a digital synchronizing generator that offers comparable performance to analog genlock techniques, while offering reduced complexity and cost.

BRIEF SUMMARY OF THE INVENTION

Briefly, in accordance with a preferred embodiment of the present principles, there is provided for frequency and phase locking a clock signal to an incoming video signal. The apparatus comprises a system clock for generating a clock signal for frequency and phase locking to the incoming video signal. A digitizer digitizes the incoming video signal to yield a digitized color sub-carrier burst component. A numerically controlled oscillator clocked by the system clock generates a phase lock reference signal for locking to the incoming video signal. A logic unit senses a static phase offset magnitude from an ideal 90° phase offset between the digitized color sub-carrier burst component and the numerically controlled oscillator output signal and generates a compensating offset in accordance with the static phase offset signal for input to the system clock to drive the static offset to zero. A color frame logic circuit detects the phase alignment between a sync edge and the color sub-carrier burst component for determining the composite video input color frame sequence and for generating at least one pulse for resetting the numerically controlled oscillator.

BRIEF DESCRIPTION OF THE DRAWINGS

FIG. 3 depicts a state diagram for a horizontal counter state machine within the logic block of FIG. 2;

FIG. 6 illustrates a block schematic diagram of the numerically controlled oscillator comprising part of the digital synchronizing generator of FIG. 1.

DETAILED DESCRIPTION

Figures 1, 1C:
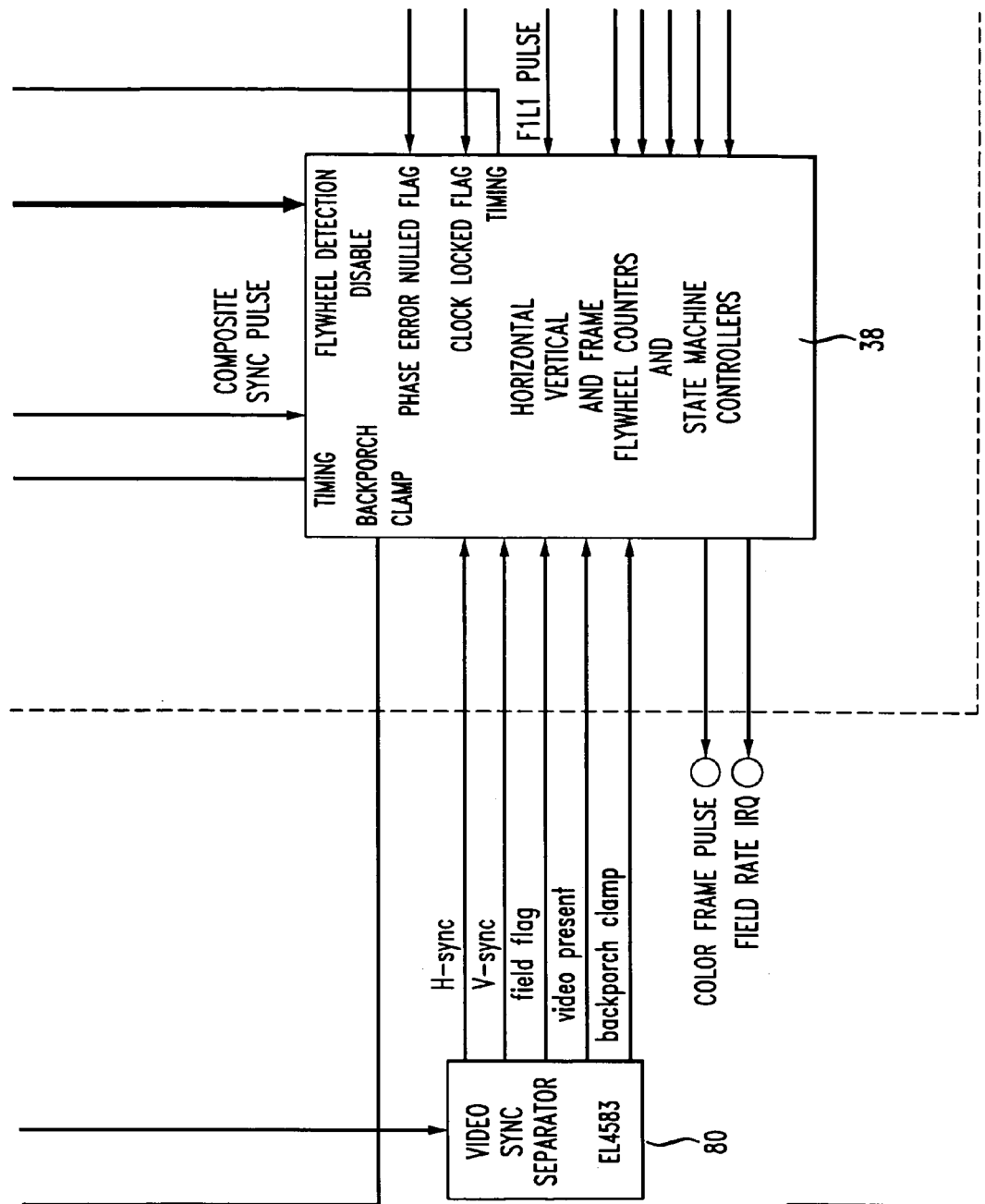
FIG. 1 illustrates a block schematic diagram of a digital synchronizing generator in accordance with the present principles.
Figure 1D:
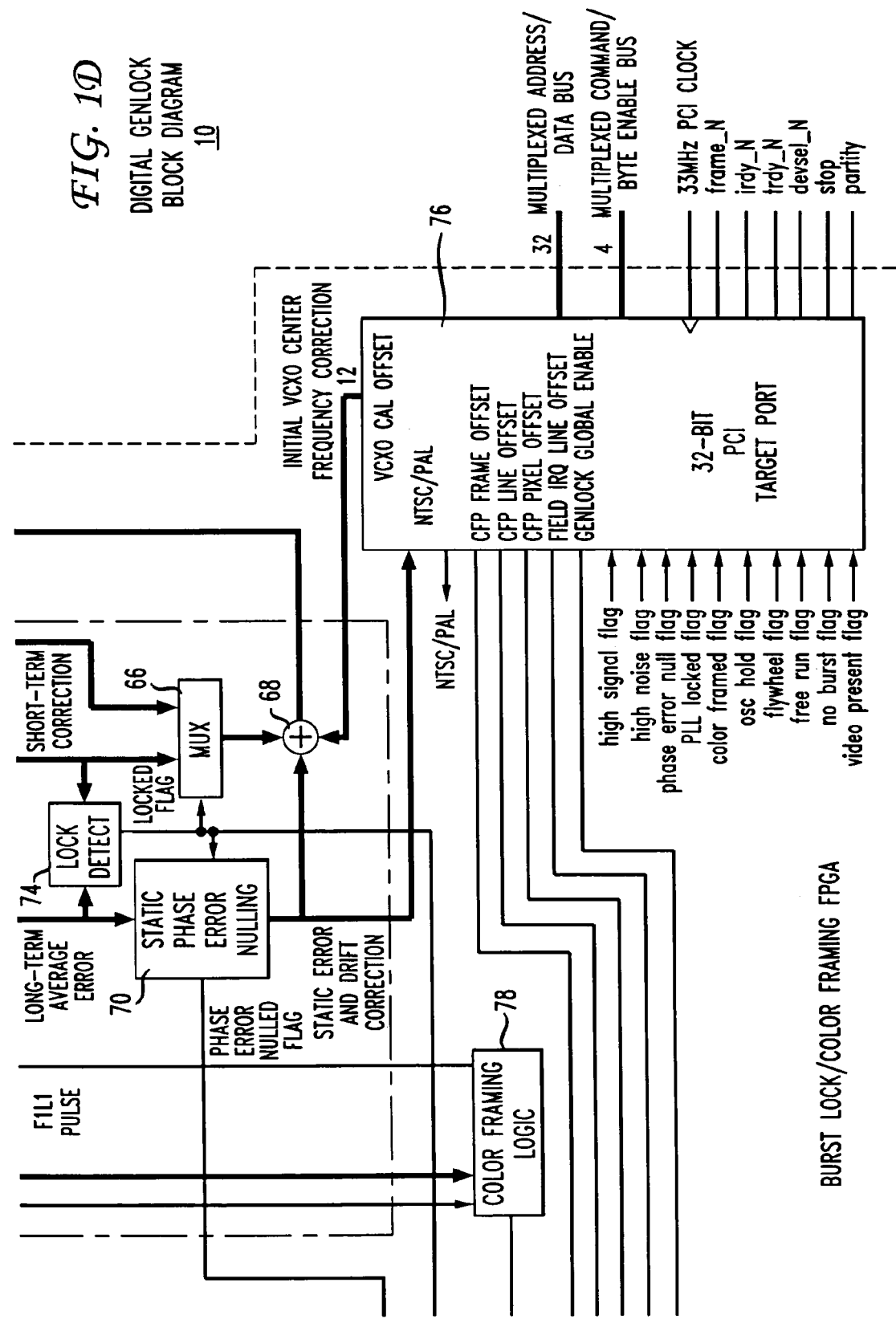

FIG. 1 depicts a block schematic diagram of an illustrative embodiment of a digital synchronizing generator 10 in accordance with the present principles. The generator 10 includes a Voltage Controlled Oscillator (VCXO) 12 that generates a clock frequency of 27 MHz for locking to an incoming video signal for synchronizing one or more video sources (not shown). The VCXO 12 responds to a VCXO correction signal generated by Burst Lock/Color framing circuit 13 and converted from a digital to an analog signal by a Digital-to-Analog Converter (DAC) 14 prior to receipt at the VCXO. As described below, the framing circuit 13 generates the VCXO correction signal in accordance with a static phase offset from an ideal 90° phase offset between the digitized burst component of the incoming video signal and a numerically controlled oscillator clock 15 described in greater detail below. In this way, the 27 MHz. clock signal becomes locked to the incoming video signal.

The 27 MHz. clock signal of the VCXO 12 serves not only as the output sync signal of the sync generator (genlock) 10, but also as a clock signal for the circuit 13 and for Analog-to-Digital Converter (ADC) 16. The ADC 16 serves to digitize an output video signal provided by an anti-aliasing filter 18 supplied at its input with the output signal of a DC restore amplifier 20, typically a model EL 2090 restore amplifier from the Elantec Products Group of Intersil Corporation, Milpitas, Calif. The amplifier 20 performs a back porch clamp on incoming the video signal to center the burst components within the operating range of the ADC 16, thus allowing the ADC to fully digitize the incoming video signal. A complementary band-split filter block 22 within the circuit 13 filters the digitized video signal received from the ADC 16 via a low-pass/high pass filtering operation to separate the sync and burst components at outputs 26 and 28, respectively. The complementary band-split filter block 22 includes a fifteen-tap folded transversal FIR filter 29 supplied with the digitized video signal produced by the ADC 16. A difference summer 30 subtracts the output signal of the FIR filter 29 from the digitized video signal received from the ADC 16. A first clamp (limiter) 32 clamps the output signal of the difference summer 30 to yield a digitized sub carrier burst component at the output 28, whereas a second clamp 34 limits the output of the difference amplifier 30 to yield a digitized sync component at the output 26.

An adaptive sync stripper circuit 36 receives the digitized sync component produced by the clamp 34 at the output 26 and generates a binary composite sync signal that is asserted low and high at approximately the 50% point of the falling and rising edges, respectively, of the H-sync portion of the digitized video input signal generated by the ADC 16. The stripper circuit 36 samples the front porch and sync tip levels on each line and calculates the 50% threshold for that line. The sync signal produced by the sync stripper 36 passes to a logic block 38 further described hereinafter with respect to FIG. 2 that includes horizontal, vertical, and frame flywheel counters, as well as associated state machine controllers. The control block 38 generates timing gates and sample pulses utilized by a sub-carrier lock loop 40 within the circuit 13 that generates the VCXO compensation signal for the VCXO 12. The sub-carrier lock loop 40 serves to frequency-lock the 27 MHz clock of the VCXO 12 to the sub carrier burst frequency of incoming video signal. Such locking occurs indirectly by frequency locking the numeric oscillator (NCO) 15 located in the sub-carrier lock loop 40.

The NCO 15, described in greater detail in FIG. 6, generates a sinusoid that has the mathematically correct ratio between 27 MHz clock of the VCXO 12 and a desired sub-carrier frequency, either 3.58 MHz (35/265) for NTSC or 4.43 MHz (709379/4320000) for PAL). The burst and regenerated sub-carrier remain in approximate phase quadrature (i.e., differing by approximately 90 degrees). The amount of static phase error is proportional to the difference between the VCXO free running frequency and the incoming burst frequency.

It is desirable for the static phase error to be as close to zero as possible. After a frequency lock has been achieved, a correction factor is slowly added to the NCO control vector until the phase error is zero (i.e., the sinusoids are in true a quadrature relationship.). As discussed inn detail hereinafter, the sub-carrier lock loop 40 includes a phase detector 42 which performs an important function in the in the frequency lock process also, as well performing phase nulling. The phase detector 42 is supplied at its first and second inputs with the output signal of the clamp 32 and the output signal of the NCO 15, respectively The output of the phase detector 42, corresponding to the difference in phase between the sub-carrier bust component and the output signal of the NCO 15, passes to a Finite Impulse Response (FIR) filter 42 for filtering. An Infinite Impulse Response (IIR) low pass filter 46 further filters the output of the FIR filter 44 to yield a phase difference signal supplied to a sample and hold circuit 46 clocked by a burst envelope detector 50.

The bust envelope detector 50 generates the timing gate for enabling the operation the sample and hold circuit 48 in accordance with the burst in the incoming video signal. To that end, the detector 50 generates the timing gate from the burst waveform itself so that the timing gate follows the envelope of the burst waveform. In the illustrated embodiment, the detector 50 includes a multiplier 52 that squares the burst waveform generated by the clamp 32 to create an all-positive waveform at twice the sub-carrier frequency (2*Fsc). An FIR filter 54 notches out the 2*Fsc frequency component generated by the multiplier 52. An IIR low-pass filter 56 further smoothes the waveform generated by the filter 54 and attenuates any wideband noise residing on the incoming composite reference. A comparator 58, having a threshold set to approximately ¼ the envelope peak, generates the burst gate when the envelope level exceeds the threshold level. The low pass filter 56 typically takes the form of either a 4-tap (NTSC) or 3-tap (PAL) moving average filter, which produces a band-reject response with a notch frequency of 6.75 MHz (NTSC) or 9 MHz (PAL). These notch frequencies are close to the 2*Fsc frequencies of 7.16 MHz (NTSC) and 8.86 MHz (PAL). The filter 56 is a first-order recursive (IIR) filter with a feed-forward coefficient=0.25 and a feedback coefficient=0.78125.

The multiplier 52 also supplies the squared burst waveform value to an IIR low pass filter 59 whose output is connected to a threshold comparator 60. Collectively, the IIR low pass filter 59 and the comparator 60 comprise a noise threshold detector that yields an output signal to control the speed of the clamping performed by the DC restore amplifier 20.

The output of the sample and hold circuit 48 is received at a 2-line phase error averaging logic circuit 62 and at V-switch extraction circuit 63. The two-line phase error averaging logic circuit 62 sums the filtered phase detector error of the current and previous PAL video lines. This integrates over the PAL V-switch alternating phase error polarity to give an average value for the phase detector error. Output clamping logic (not shown) prevents arithmetic overflow or underflow. For NTSC, the phase detector error output is used directly. The V-switch extraction logic 63 samples the response of the IIR filter 46 at the end of burst gate to determine the polarity of the filter response, which alternates line-to-line in PAL synchronized with the V-switch modulation of the sub-carrier. This signal is used to reduce in half the number of frames examined to determine the first frame (i.e., frame 1) in each PAL four-frame color frame sequence. This logic is not active for NTSC video.

The output of the 2-line phase error averaging logic circuit 62 is received at a first line-rate IIR low pass filter 64. The output of the IIR low pass filter 64 and the 2-line phase error averaging logic circuit 60 are received at a multiplexer 66 that feeds one input of a summer 68 whose output signal serves as the VCXO correction signal input to the DAC 14. The summer 68 has another input at which it receives the output of a static phase nulling circuit 70, supplied at its input from a second line rate IIR low pass filter 72 that receives the output of the first line-rate IIR low pass filter 64.

The first line rate IIR low-pass filter 64 provides a short-term correction value, whereas the output signal of the second line rate IIR low-pass filter 72 provides a long-term correction value. The long-term correction value generated by the second line rate IIR low-pass filter 72 causes the static phase error nulling circuit 70 to slowly add a correct value for input to the summer 68. The static phase error nulling circuit 70 continues to add such a correction value until a phase lock detector circuit 76, supplied from both of the first and second IIR low-pass filters 64 and 72, respectively, detects a zero phase difference. As discussed previously, driving the static phase error as close to zero as possible serves to reduce the difference between the frequency of the VCXO 12 and the incoming burst frequency to as close to zero as possible.

Optionally, the summer 68 can receive an initial VCXO correction signal from an interface port 76 that serves to interface the sync circuit 10 to an external processor, such as a personal computer (not shown). In this way, an operator can advantageously pre-program the sync circuit 10 with default values. However, the interface port 76 is not essential and can be omitted without adverse effect.

The genlock 10 of FIG. 1 includes a color framing logic circuit 78 supplied with the output signal of phase detector 42 and the v-switch extract logic circuit 62. The color frame logic circuit 78 detects the sync edge-to-sub-carrier phase alignment (SCH-phase) that marks the beginning of a 2-frame (NTSC) or 4-frame (PAL) color frame sequence. Two color frame pulses are generated by the color framing logic circuit 78, one which tracks pixel counting within the block 38 synchronized to the digital H-sync component and the other that tracks counting synchronized to the burst phase. The H-sync tracking color frame pulse is used once during lock acquisition to reset the NCO 15 to establish a fixed sample phase relationship between the VCXO and a reference waveform. The burst tracking color frame pulse is the actual system color frame pulse, and has the capability to track shifts in the reference waveform of the SCH-phase.

The block 38 receives the two output pulses from the color frame logic circuit 78. In addition, the block 38 also receives H-Sync, V-Sync, field flag, video present and back porch clamping signals from a video sync separator 80 supplied with the output signal from the DC restore amplifier 20. In practice the sync separator 80 comprises a model EL 4583 sync separator manufactured by the Elantech Products Group of Intersil, Inc. As discussed previously, the block 38 generates timing gates and sample pulses for controlling the sub-carrier loop 44.

Figure 2B:
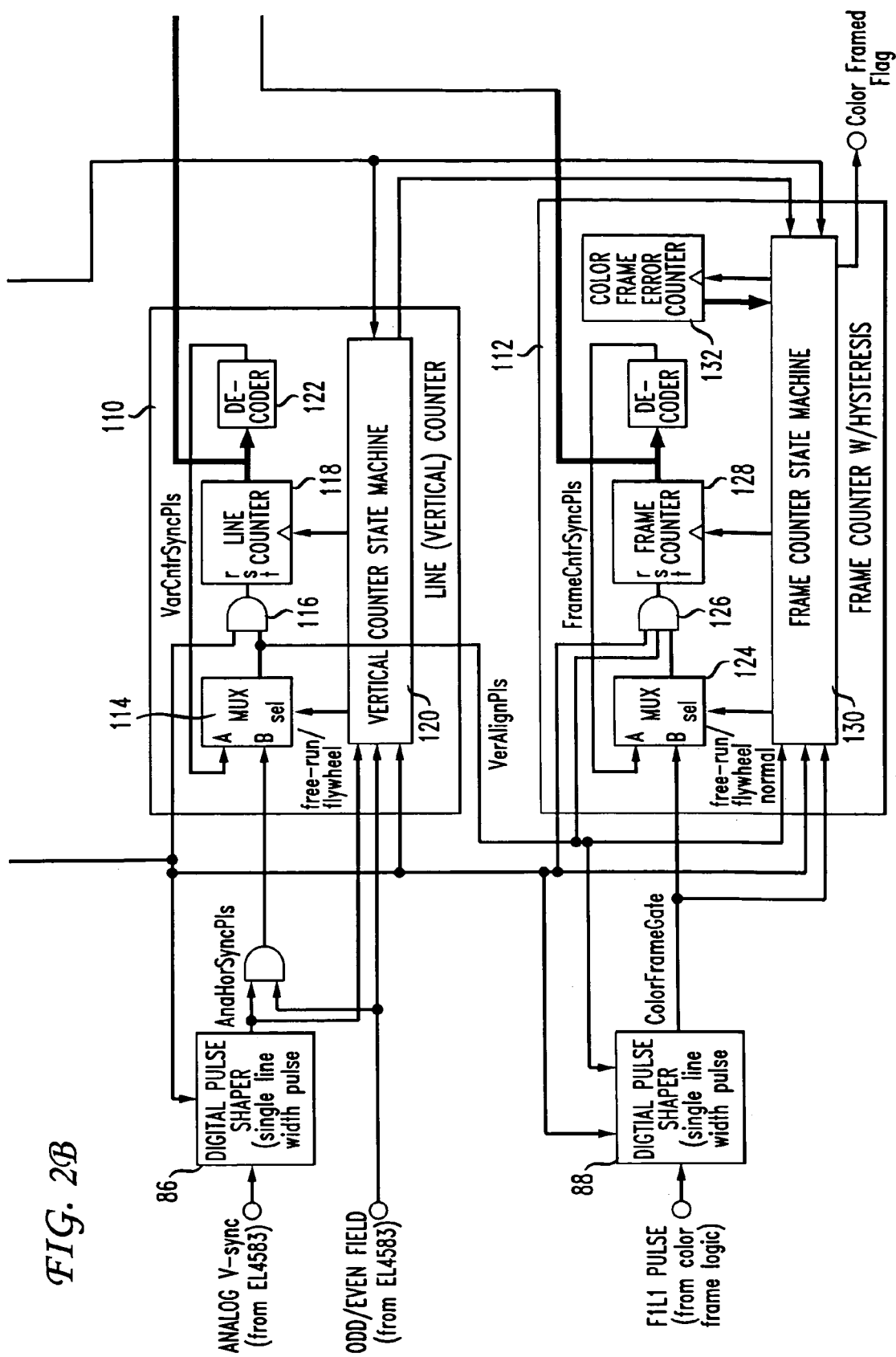
FIG. 2 illustrates a block schematic diagram of a logic block for controlling a sub-carrier lock loop within the digital synchronizing generator of FIG. 1.

The details of the block 38 appear in FIG. 2. Referring to FIG. 2, the block 38 includes a pair of digital one-shot circuits 82 and 84, and a pair of digital pulse shapers 86 and 88, respectively. The digital one-shot circuit 82 produces a single clock width pulse in response to an analog horizontal sync pulse from the sync separator circuit 80 of FIG. 1. This pulse is generated once per video line. The single clock pulse from the one shot circuit 82, labeled as "AnalHorSyncPls", serves as a once-per-line count reset signal supplied to a H-sync gate counter 90 comprising part of a digital H-sync discriminator circuit 92. The video preset signal from the sync separator 80 of FIG. 1 serves as the count enable signal for the H-sync gate counter 90 whose count undergoes decoding by a decoder 94. The decoder 94 decodes the count from the counter 90 to yield a first output signal that serves as a timing gate for the adaptive sync stripper 36 of FIG. 1, and a second output signal that serves as an input to an AND gate 96. The second input to the AND gate 96 originates from the digital one-shot circuit 84. The one-shot circuit 84 is triggered by a digital horizontal sync signal from the adaptive digital sync stripper circuit 36 of FIG. 1.

The AND gate 96 of FIG. 2 generates pulses ("DigHorSyncPls") at its output that align with the horizontal sync edges of the digital sync stripper output. The 20-clock wide gate generated by the H-sync discriminator circuit 92 filters vertical interval serration pulses that would otherwise produce erroneous DigHorSyncPls transitions). The AND gate 96 output signal serves as one of the two input signals of a multiplexer 98 that comprises part of a pixel (horizontal) counter and logic block 100. The block 100 also includes a horizontal pixel counter 102 clocked by the system video clock signal supplied by the VCXO 12 of FIG. 1. The counter 102 undergoes a reset in response to the output signal of the multiplexer 98, designated as "HorAlignPls". The pixel count generated by the counter 102 passes to decoder within the block 100 which generates a horizontal control sync pulse signal, designated "HorCntrSyncPls" that is received at a second input of the multiplexer 98. Decoder 104 also generates a horizontal control sync gate signal, designated as "HorCtrSyncGate" for receipt at first input of a horizontal counter state machine 105 that provides the control for the block 100.

The control block 105 has addition inputs for receiving: (a) the video present signal generated by the video sync separator circuit 80 of FIG. 1, (b) a Phase Lock Loop (PLL) lock flag from the PLL lock detector 74 of FIG. 1, (c) a no-burst flag from the burst envelope detector 50 of FIG. 1, and (d) a high noise flag from the burst envelope detector 50. The state of various input signals to the state machine 105 of FIG. 2 prescribes the state of output signals produced by the machine. FIG. 3 depicts the state diagram for the state machine 105 showing the relationship between input and output signals. The following abbreviations apply to FIG. 3:

GE: Genlock Enable (control register bit)
VPF: Video Present Flag (from video sync separator 80 of FIG. 1)
NBF: No Burst Flag (from Burst Envelope Detector 50 of FIG. 1)
DHSP: Digital Horizontal Sync Pulse horizontal sync pulse (from video sync separator 80)
DHSG: Digital Horizontal Sync Gate (7 clock gate from Horizontal Counter 100 of FIG. 2)
HCSG: Horizontal Counter Sync Gate (5 clock gate from Horizontal Counter 100)
HAP: Horizontal Alignment Pulse (Horizontal Counter 100 reset pulse)
NormalGate—asserted after NCO 15 sample phase alignment is achieved
CLE: Clock Lock Flag
HNF: High Noise Flag
VCE Vertical Counter 110 enabled●

Among the output signals generated by the state machine 105 is a free-run/flywheel signal that serves as the select signal for the multiplexer 98. The state machine 105 also generates a pair of clock signals for clocking each of a pair of counters 106 and 108 that provide a count of missing sync pulses and missing burst signals, respectively. The state machine 105 of FIG. 3 also generates the "HorCntrEn" signal, which qualifies operation of the vertical line counter 100 and frame counter 112. Further, the state machine 105 generates a free run flag, a flywheel flag, and a burst absent flag. The free run and flywheel flags indicate when aberrant conditions exist upon power up, and after entry of the normal mode, respectively. The burst-absent flag signals the absent of a burst component in the incoming video signal.

In addition to the horizontal pixel counter 100, the block 38 of FIG. 2 also includes a vertical line counter 110 and a frame counter with hysteresis 112. As its name implies, the line counter 110 provides a line count on each field of each incoming frame. To accomplish this task, the vertical line counter 110 includes a multiplexer 114 supplied at a first input with the output of an AND gate 116. The gate 116 has its first input supplied with the output of the digital pulse shaper circuit 86 that generates a single line width pulse in response to the receipt of an analog Vertical Sync pulse from the video sync separator circuit 80 of FIG. 1. The second input of the AND gate 116 of FIG. 2 receives the HorAlignPls signal from the multiplexer 98, which signal is also supplied to the digital pulse shaper circuit 86.

Figure 4:
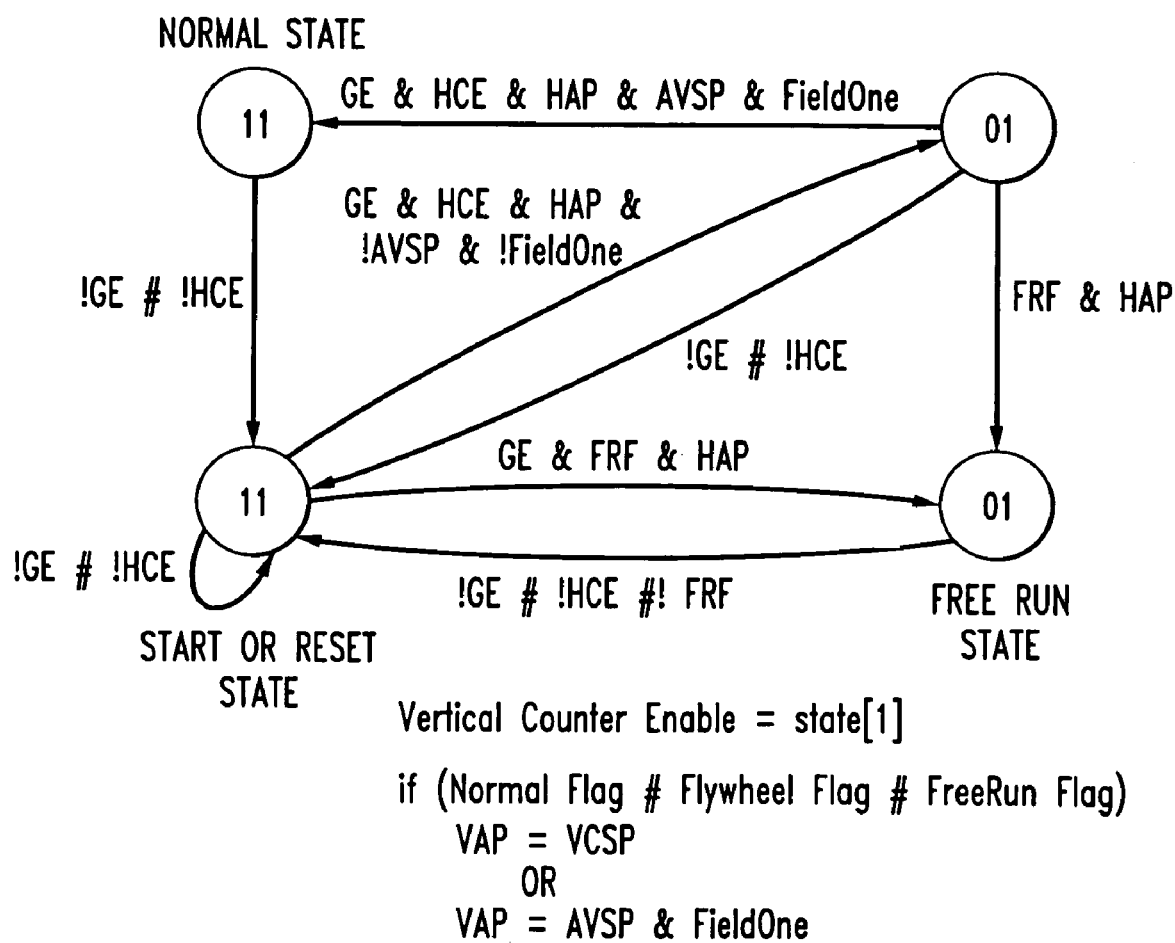
FIG. 4 depicts a state diagram for a vertical counter state machine within the logic block of FIG. 2

The output signal of the AND gate 116 serves as the reset signal for a line counter 118 clocked by an output signal from vertical counter state machine 120 to count the lines in each field. The output of the line counter 118 undergoes decoding by a decoder 122, which generates an output signal supplied to the second input of the multiplexer 114. In addition to generating the clock signal for the line counter 120, the state machine 120 also generates a control output signal "VerCntrEn" for input to the frame counter 112. The status of the output signals generated by the state machine 105 depends on input signals it receives. As seen in FIG. 2, the state machine input signals include: (a) the output pulse ("AnalVerSyncPls") of the digital pulse shaper 86, (b) a signal (not shown) from the analog sync stripper 80 of FIG. 1 designating whether the field is odd or even, and (c) the output signal HorAlignPls from the multiplexer 98 of FIG. 2 within the pixel counter 100. FIG. 4 depicts the state diagram of the state machine 120 showing the relationship between input and output signals. The following abbreviations apply to FIG. 4:

GE: Genlock Enable (control register bit)
VPF: Video Present Flag (from video sync separator 80 of FIG. 1)
FRF: FreeRun Flag (decoded from Horizontal Counter 100 of FIG. 2)
FWF: Flywheel Flag (decoded from Horizontal counter state machine 105 of FIG. 2.
NMLF: Normal Flag (decoded from Horizontal counter state machine 105)
NBF: No Burst Flag (from burst envelope detector 50 of FIG. 1)
CLF: Clock Lock Flag (from lock detect logic 74 of FIG. 1)
PNF Phase Null Flag (from lock detect logic 74)
HNF: High Noise Flag (from envelope detect logic)
DHSP Digital Honzontal Sync Pulse (horizontal sync from digital sync stripper)
DHSG: Digital Horizontal Sync Gate (7 clock gate from Horizontal counter 100)
HCSG Horizontal Counter Sync Gate (5 clock gate from Horizontal Counter 100)
HAP: Horizontal Alignment Pulse (horizontal counter reset pulse)
VAP: Vertical Alignment Pulse (vertical counter reset pulse)
NormalGate: asserted after NCO sample phase alignment achieved
AVSP: Analog Vertical Sync Pulse (Vertical sync from video sync separator 80)
VCSP: Vertical Counter Sync Pulse (Vertical sync from Vertical Counter 110 of FIG. 2)
FieldOne field ID, I=field 1, 0=field 2 (from video sync separator 80)
FCSP: Frame Counter Sync Pulse (frame sync from Frame Counter 112 of FIG. 2)
F1L1: field 1 line 1 color frame gate (from color frame logic 78 of FIG. 1)
CFCcount Color Frame Confidence Count
HCE Horizontal Counter Enable (from Horizontal counter state machine 105)
VCE. Vertical Counter Enable (from Vertical Counter state machine 120 of FIG. 2)

Referring to FIG. 2, the frame counter 112 comprises a multiplexer 124 supplied at its first input with the output signal ("ColorFrameGate") of the digital pulse shaper 88 which receives at its input the output pulses of the color framing logic circuit 78 of FIG. 1. The multiplexer 124 of FIG. 2 provides its output signal to a first input of a three-input AND gate 126 which receives the output signal of the multiplexer 98 ("HorAlignPls") and the output signal of the multiplexer 114 ("VerAlignPls") at each of its remaining two inputs, respectively. The output signal of the AND gate 126 serves as the reset signal for a frame counter 118 clocked by an output signal from a frame counter state machine 130 to count the number of frames enabled by the vertical and horizontal counter sync pulses. The output of the line counter 118 undergoes decoding by a decoder 130, which generates an output signal supplied to the second input of the multiplexer 124.

Figure 5:
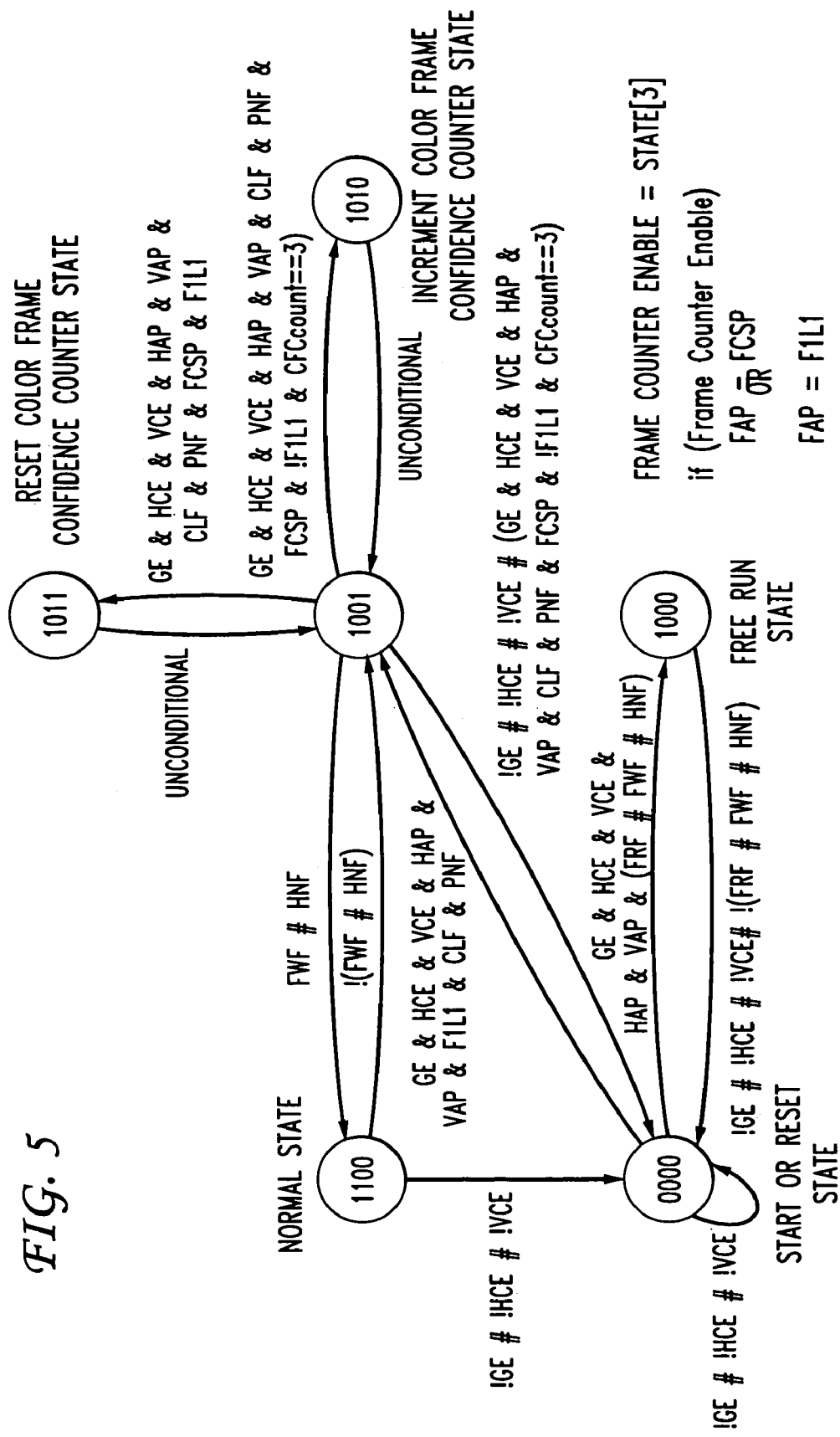
FIG. 5 depicts a state diagram for a frame counter state machine within the logic block of FIG. 2.

The frame counter state machine 130 generates the clock signal for the frame counter 128 and the clock signal for a color frame error counter 132, as well as a Color Framed flag, in accordance with the state of the output signal of the digital pulse shaper 88 ("ColorFramegate") and the signals VerAlignPls and HorAlignPls from the multiplexers 98 and 114, respectively. FIG. 5 depicts a state diagram for the state machine 130 showing the relationship between input and output signals.

The output signal of the pixel counter 102 (which constitutes the output count of the block 108) serves as an input signal to a first output decoder 134 having a second input supplied with the line count generated by the line counter 118 within the block 110. In accordance with the pixel and line counts, the decoder 134 generates the following signals: (a) burst window (supplied to the color sub-carrier phase lock loop), (b) phase delay error sample pulse (supplied to the sub-carrier phase lock loop), (c) sub-carrier sample pulse (supplied to the color framing logic block 78 of FIG. 1) and (d) a VCXO DAC latch pulse.

A second output decoder 136 receives the frame count from the frame counter 128, the line count from the line counter 118, and the pixel count from the pixel counter 102. In addition, the decoder 136 receives initial color frame pixel, line and frame offsets, as well as a field interrupt line offset via the interface 76 of FIG. 1. In accordance with the state of its input signals, the decoder 136 generates a color flame pulse and a field interrupt pulse.

FIG. 6 illustrates the details of the Numerically Controlled Oscillator (NCO) 15. The NCO 15 comprises a modulo-256 register 140, which provides a first input signal to a summer 141 whose output signal serves as the address for a 256-length sinusoid ROM 142 that generates a 6-bit sub-carrier sinusoid, representing the output of the NCO 15. The summer 141 receives a reference value at its second input, corresponding to a value of 84 for an NTSC signal, and 192 for a PAL signal.

The register 140, which controls the addressing of the sinusoid ROM 142, is supplied at its input with an eight-bit output signal of a summer 142. The summer 142 receives at a first input the output of the register 140. At a second input, the summer 142 receives a reference count of thirty-two for an NTSC signal and forty-two for a PAL signal, while at a third input, the summer receives the output of a carry register 144. The carry register 144 receives the output signal of a summer 146 whose output signal is also received at a 148 configured as a modulo-16896 for NTSC operation and modulo-16875 for PAL operation. The summer 146 is supplied at a first input with the output of the register 148 and is supplied at a second input with the output of a multiplexer 150 having a first input supplied with counts of 15872 and 31744 for normal and overflow operation, respectively, in an NTSC mode. The multiplexer 150 has a second input supplied with counts of 629 and 16522 for normal and overflow operation, respectively, in a PAL mode. A color frame pulse from the color framing logic circuit 78 resets the carry register 144 and the register 148.

The NCO 15, configured in the manner depicted in FIG. 6, serves as a two-stage ratio counter that generates an NTSC or PAL 6-bit digital sub-carrier sinusoid with the correct long-term frequency ratio relationship to a 27 MHz clock. For NTSC, Fcarrier/Fclock=35/264, while for PAL, Fcarrier/Fclock=709379/4320000. This ratio is partitioned into two fractions, the most significant of which is implemented by a register 140 that serves as an accumulator, which provides the waveform ROM address, or sub-carrier phase. The denominator of this most significant ratio is equal to the table length (256), which must be a power of two so that modulo wrap-around is automatic. The least significant ratio is implemented by register 148 that serves as an accumulator that provides a periodic correction factor to the most significant ratio, keeping the long-term clock-to-carrier frequency ratio exact. Since the least significant ratio accumulator is not a modulo-power-of-2, an overflow correction factor must be accumulated, via the carry register 144, which appropriately asserts a carry bit.

The first color frame pulse occurring after the horizontal counter logic is enabled resets the NCO 15 by resetting the carry register 144 and the register 148. A color frame sequence consists of four fields for NTSC and eight fields for PAL. This one-shot reset establishes a consistent, repeatable sample phase relationship between the generated sub-carrier data and the 27 MHz VCXO 12 of FIG. 1, which in turn establishes a fixed relationship between the 27 MHz clock and the reference video waveform. At the first color frame pulse after operation of the genlock 10 of FIG. 1 is enabled, this sample phase is random within the 27 MHz clock period. However, after the NCO 15 is reset with this pulse, the repeatable sample phase relationship is established. This is important when generating analog composite video outputs, where any shift in the encoder clock edge changes the output timing.

The genlock 10 has the following modes of operation:
1. Free-Run Mode
2. Lock Acquisition Mode
3. Normal Mode
4. Flywheel Mode
5. Reset State Standard operation of the genlock 10 commences upon application of a video source to the video input port before power-up, then powering up the genlock, and enabling operation by setting a Genlock Enable bit "high". Typically, the system initialization software normally sets this bit high automatically after power up. Prior to assertion of the Genlock Enable bit, various characteristics of the genlock 10 must be programmed via control registers. The Genlock Enable bit is the last field to be programmed. Upon the presence of a valid composite video input, the genlock 10 transitions to the Lock Acquisition Mode and then the Normal Mode. If a valid composite video input is not present, the genlock 10 transitions to Free Run Mode until it detects a valid composite video input. Thereafter, the genlock 10 then proceeds to the reset state and to the Lock Acquisition Mode.

In the Lock Acquisition Mode, the 27 MHz VCXO 12 of FIG. 1 becomes frequency and phase locked to the input video burst reference and static phase error is nulled. Once a frequency lock and a null occur, the genlock 10 transitions to the Normal Mode after generation of the second color frame pulse. In this mode, the VCXO frequency continues to be controlled by the servo action of the sub carrier lock loop 40 of FIG. 1, but the Horizontal, Vertical and Frame counters 100, 110, and 112, respectively are auto-timed, that is, they are no longer periodically reset by input waveform timing datums. The H-sync datum from the sync stripper 36 is qualified by a 7-clock window to reject possible spurious H-syncs caused by impulse noise on input video. The genlock 10 remains in the normal mode as long as a valid video composite signal appears at the input.

The genlock 10 of FIG. 1 enters the Free Run and Flywheel Modes when aberrant input conditions exist. The Free Run Mode becomes active when an aberrant condition occurs on power up, while Flywheel Mode becomes active when an aberrant condition occurs after entry of the Normal Mode.

Reset State

The genlock enters its reset state under the following conditions:
1. Immediately after power up;
2. A global reset input is asserted "low";
3. The Genlock Enable bit is set to 0;
4. The Clock Lock Flag is de-asserted in Normal or Flywheel Mode;
5. A missing H-sync is detected in Lock Acquisition Mode;
6. A valid video input is detected when in the Free Run Mode; or
7. A video reference reappears after 128 lines are counted during flywheel operation.

Free Run Mode

On power-up, the genlock 10 is forced into "video absent" Free Run Mode if a valid composite video input does not appear at the input (as indicated by de-assertion of the Video Present Flag generated by the video sync separator 80 of FIG. 1) while the Genlock Enable control bit is asserted. Alternatively, the genlock 10 is forced into "burst absent" Free Run Mode if the input video burst is missing for 16 consecutive lines while in the Lock Acquisition Mode. Such a sequence exists for a monochrome input video signal.

In Free Run Mode the following sequence of events occurs:
1. The Free Run Flag is asserted (and possibly, the Burst Absent Flag);
2. The 27 MHz VCXO control signal is forced to its calibrated free run value;
3. The horizontal counter 100 is immediately enabled
4. The vertical counter 110 becomes enabled on the first instance of the horizontal counter 100 output signal HorCtrlSyncPls (HCSP); and
5. The frame counter 112s enabled on the first coincidence of the HCSP signal and the vertical counter VerCtrl-SyncPls (VCSP) signal.

At this point, a free-running Color Frame Pulse is generated by the color framing logic 78 at an interval equivalent to two (NTSC) or four (PAL) video frames, synchronous to the free running 27 MHz VCXO clock frequency.

The genlock 10 leaves the "video absent" Free Run Mode and enters the reset state when the Video Present Flag is asserted. The genlock 10 leaves the "burst absent" Free Run Mode and re-enters the Lock Acquisition Mode when the burst envelope detector detects burst is present on a video line.

Lock Acquisition Mode

In Lock Acquisition Mode, the 27 MHz VCXO clock 12 of FIG. 1 becomes frequency and phase locked to the input video burst reference through the Phase Lock Loop (PLL) servo action of the subcarrier block 40. On power-up, the genlock 10 enters Lock Acquisition Mode on the first instance of the Digital Horizontal Sync Pulse (DHSP) from the sync stripper 36 of FIG. 1. This transition is conditional on the Video Present Flag from the sync separator 80 of FIG. 1 being asserted and the Genlock Enable control bit being asserted. In this mode the following sequence of events occurs:
1. The VCXO is released from its free-run calibrated value.
2. The burst-lock-loop begins lock acquisition. Timing signals for the acquisition process are derived from the video signal itself, that is, from the H/V-sync and field flag signals from the analog sync stripper 80 and the DHSP signal from the Adaptive Digital Sync Stripper. The horizontal counter 100 is enabled on the first instance of DHSP and increments at a pixel rate. Subsequent DHSP pulses are qualified by a 7-clock width window (DigHorSyncGate) centered at the expected DHSP and generated by the horizontal counter. This gate signal is used to reject possible spurious H-sync pulses caused by impulse noise on the video input.
3. The vertical counter 110 is enabled on the first coincidence of the DHSP and the Analog Vertical Sync Pulse (AVSP), and increments at a line rate coincident with the DHSP pulse. These counters generate the line-rate burst gate and sample-and-hold pulses. The filtered signal of the phase detector 74 controls the VCXO frequency via the DAC 14. This correction vector is updated once a line.
4. The VCXO clock frequency varies as correction vectors are applied to it.

Burst lock is achieved when the subcarrier frequency generated by the NCO 15 equals the reference video's burst frequency, and the burst and the NCO phases are approximately in quadrature. At this point, the 27 MHz of the VCXO 12 is frequency locked to the reference video's subcarrier burst and the Clock Lock Flag is asserted. Status phase error nulling servo action then begins by the action of the static phase nulling circuit 70. The magnitude of the phase detector error is proportional to the difference between the input video burst frequency and the free-running NCO frequency. The static phase error offset vector is incremented every 16 lines in the polarity that drives the static phase error to zero. Once the static phase error falls within a hysteresis window, the Phase Null Flag is asserted and color framing commences.

The first generated color frame pulse resets the NCO 15 to a calibrated phase reference point. This perturbation generally forces a restarting of the lock acquisition process. This one-shot reset is necessary to ensure a repeatable sample phase relationship between the 27 MHz clock generated by the VCXO 12 and the reference waveform. Without this one-shot reset, the 27 MHz clock edge and system color frame pulse have a random phase relationship to the reference waveform within a 27 MHz clock period.

The second generated color frame pulse transitions genlock 10 operation to Normal Mode. While in Acquisition Mode, the genlock 10 is forced to its reset state if the DHSP is not asserted by H-count=1800 on any line, or if the Video Present Flag is de-asserted. If burst is not detected for 16 consecutive lines, the genlock 10 is forced into Free Run Mode.

Normal Mode

This is the steady state operational mode of the genlock 10. In Normal Mode, the following events occur simultaneously.
1. The horizontal, vertical and frame counters 100, 110 and 112, respectively, reset themselves to achieve modulo counting. They are no longer periodically reset by timings signals originating from the analog sync stripper 80 and the adaptive digital sync stripper 36.
2. Detection of a flywheel conditions is enabled. If DHSP is not detected within a 5-clock gate centered about the expected position of the DHSP pulse, or if the Video Present Flag is de-asserted, the Flywheel Mode is entered. The gate is decoded from the horizontal counter 100.
3. Color framing verification process continues. The frame counter 112 is enabled on the first coincidence of the DHSP, AVSP, and Color Frame Gate (CFG). This is the initial color framing decision. The CFG originates from the Color Frame Logic Block 78. This gate signal is asserted when the sync-edge to NCO-sinusoid phase relationship indicating the beginning of a color frame sequence is detected. The frame counter 112 increments at a frame rate and generates a Frame Count Sync Pulse (FCSP) every two frames (NTSC) or four frames (PAL). At the end of every color frame sequence, the CFG and FCSP are checked for alignment. If these pulses are mis-aligned for four consecutive color frame sequences, the color framing process is re-enabled. This hysteresis prevents color frame hopping when the input video SCH-phase is ambiguous.
4. Line-rate recursive filtering is enabled within loop correction data path with through RC-type response with an influence of approximately 60 lines. Enabling this type of filtering slows the loop response and substantially reduces clock jitter. The result is a dual-speed PLL, with quick response during acquisition for fast locking followed by slow response during normal locked operation for low clock jitter.

If the Clock Lock Flag is de-asserted in Normal Mode, the genlock 10 returns to its acquisition state.

Flywheel Mode

The Flywheel Mode allows the genlock 10 to "flywheel" (count through) through "short" dropouts of the video input. The Video Present Flag generated by the video sync separator 80 can take up to 4 ms to reliably de-assert after removal of the composite video input signal. Detecting a missing sync pulse is a faster mechanism for detecting video dropouts. The genlock 10 enters the Flywheel Mode from the Normal Mode if the DHSP does not occur within a 5-clock wide timing window generated by the horizontal counter 100. At this point H-sync is assumed missing for that line. In the Flywheel Mode, the following events occur simultaneously.

1. The horizontal, vertical and frame counters 100, 110 and 112, respectively, continue to reset themselves to achieve modulo counting. Video input timing datums are ignored. The counters therefore "flywheel".
2. The VCXO correction vector is held at the previous line's value.
3. The horizontal counter 100 generates a 5-clock wide gate centered on the expected position of DHSP. Every line the DHSP does not occur within the gate, a "sync missing" counter is incremented.

If the DHSP is detected within the gate, the genlock 10 returns to Normal Mode and the "sync missing" counter is reset. If the Video Present Flag is asserted when the "sync missing" count reaches 128 (approximately 8 ms), the genlock 10 is forced into its reset state. If the Video Present Flag is de-asserted after 128 lines, which is the likely case if the composite video input signal was removed, the genlock 10 enters the "video absent" Flywheel Mode. When the Video Present Flag is re-asserted, the genlock 10 transitions from the "video absent" Flywheel Mode to the Lock Acquisition Mode on the first instance of DHSP. If the input video was not absent for very long, the DHSP and HCSP may align and the PLL may not need much correcting. The genlock 10 may transition back to Normal Mode. The genlock 10 is forced to its reset state if the re-applied input video timing does not align with the flywheel counter timing.

The foregoing describes a digital genlock for synchronizing an incoming composite video signal to a clock frequency.

The invention claimed is:

1. Apparatus for frequency and phase locking a clock signal to an incoming video signal, comprising:
   a system clock for generating a clock signal for frequency and phase locking to the incoming video signal;
   a digitizer for digitizing the incoming video signal to yield a digitized color sub-carrier burst component;
   a numerically controlled oscillator clocked by the system clock for generating a phase lock signal for locking to the incoming video signal;
   a logic unit for sensing a static phase offset magnitude from an ideal 90° phase offset between the digitized color sub-carrier burst component and the numerically controlled oscillator output signal and for generating a compensating offset in accordance with the static phase offset signal for input to the system clock to drive the static offset to zero; and
   a color frame logic circuit for detecting phase alignment between a sync edge and the color sub-carrier burst component for determining the composite video input color frame sequence and for generating at least one pulse for resetting the numerically controlled oscillator.

2. The apparatus according to claim 1 wherein the numerically controlled oscillator further comprises a two-stage ratio counter for generating a multi-bit sub-carrier sinusoid having a prescribed frequency relationship with clock signal of the system clock.

3. The apparatus according to claim 1 wherein the system clock further comprises a voltage controlled oscillator that generates a 27 MHz clock signal.

4. The apparatus according to claim 3 wherein the numerically controlled oscillator further comprises a two-stage ratio counter for generating a multi-bit sub-carrier sinusoid having a prescribed frequency relationship with 27 MHz clock signal of the system clock such that sub-carrier/clock frequency ratio for an NTSC signal is 35/264, and 709379/4320000 a PAL signal.

5. The apparatus according to claim 1 wherein the logic unit further comprises:
   a phase detector for detecting the phase difference between the digitized color sub-carrier burst component and the numerically controlled oscillator output signal and for generating an output signal which varies accordingly;
   a phase lock detector responsive to the phase detector for generating an output flag once the numerically controlled oscillator output signal becomes phase locked to the digitized color-sub-carrier burst component; and
   a static phase nulling circuit responsive to the phase detector output signal for generating a nulling signal for controlling the system clock to null the phase difference until receipt of the phase detector output flag.

6. The apparatus according to claim 1 wherein the digitizer comprises:
   an analog to digital (A/D) converter for generating a digital output signal in accordance with the incoming video signal received at the input to the A/D converter;
   a complimentary bandsplit filter for separating the color sub-carrier burst component from the digital input signal received from the A/D converter; and
   a clamp for limiting the color sub-carrier burst component.

7. The apparatus according to claim 1 wherein the color frame logic circuit marks the beginning of the color frame sequence with a color frame pulse.

8. The apparatus according to claim 1 further including a counter block for counting pixels, lines and color frames to control a transition among normal operating mode at which the system clock signal is frequency and phase locked to the incoming video signal, a flywheel mode at which temporary losses of the incoming video signal are ignored and the system clock is held at a last correction mode, and free-running operation at which the system clock is forced to a calibrated value.

9. The apparatus according to claim 8 wherein the counter block further comprises:
   a digital sync discriminator for generating a digital horizontal sync pulse in accordance with a horizontal sync pulse in the incoming video signal when the video signal is present;
   a pixel counter responsive to the digital horizontal sync pulse for counting pixels; and
   a state machine for controlling the pixel counter and for initiating the transition among normal, flywheel and free-running operation.

10. The apparatus according to claim 9 wherein the counter block further comprises:
   a line counter for counting lines within the incoming video signal; an
   a line counter state machine for controlling the operation of the line counter.

11. The apparatus according to claim 9 wherein the counter block further comprises:
- a frame counter for counting frames within the incoming video signal; and
- a frame counter state machine for controlling the operation of the frame counter.

12. A method for frequency and phase locking a clock signal to an incoming video signal, comprising the steps of:
- generating a system clock signal for frequency and phase locking to the incoming video signal;
- digitizing the incoming video signal to yield a digitized color sub-carrier burst component;
- generating a phase lock signal for locking to the incoming video signal; and
- sensing a static phase offset magnitude from an ideal 90° phase offset between the digitized color sub-carrier burst component and the phase lock signal; and
- generating a compensating offset in accordance with the static phase offset signal for input to the system clock to drive the static offset to zero.

13. The method according to claim 12 wherein the step of generating a phase lock signal further comprises the step of generating a multi-bit sub-carrier sinusoid having a prescribed frequency relationship with the system clock signal.

14. The method according to claim 12 wherein the step of generating the system clock signal further comprises the step of generating a 27 MHz signal.

15. The method according to claim 14 wherein the step of generating the phase lock signal comprises the step of generating a multi-bit sub-carrier sinusoid having a prescribed frequency relationship with 27 MHz clock signal of the system clock such that sub-carrier/clock frequency ratio for an NTSC signal is 35/264, and 709379/4320000 a PAL signal.

16. The method according to claim 12 wherein the step of digitizing the incoming video signal further comprises the steps of:
- converting the incoming video signal into a digital signal;
- filtering the digital signal to separating the color sub-carrier burst component; and
- limiting the color sub-carrier burst component.

17. The method according to claim 16 further including the step of detecting phase alignment between a sync edge and the color sub-carrier burst component for generating at least one pulse for resetting the numerically controlled oscillator and to determine a color frame sequence.

18. The method according to claim 12 further including the step of counting pixels, lines and color frames to control a transition among normal operating mode at which the system clock signal is frequency and phase locked to the incoming video signal, a flywheel mode at which temporary losses of the incoming video signal are ignored and the system clock is held at a last correction mode, and free-running operation at which the system clock is forced to a calibrated value.

19. Apparatus for frequency and phase locking a clock signal to an incoming video signal, comprising:
- a system clock for generating a clock signal for frequency and phase locking to the incoming video signal;
- a digitizer for digitizing the incoming video signal to yield a digitized color sub-carrier burst component;
- a numerically controlled oscillator clocked by the system clock for generating a phase lock signal for locking to the incoming video signal; and
- a logic unit for sensing a static phase offset magnitude from an ideal 90° phase offset between the digitized color sub-carrier burst component and the numerically controlled oscillator output signal and for generating a compensating offset in accordance with the static phase offset signal for input to the system clock to drive the static offset to zero; and
- a counter block for counting pixels, lines and color frames in the incoming video signal to control a transition among normal operating mode at which the system clock signal is frequency and phase locked to the incoming video signal, a flywheel mode at which temporary losses of the incoming video signal are ignored and the system clock is held at a last correction mode, and free-running operation at which the system clock is forced to a calibrated value.

20. The apparatus according to claim 19 wherein the counter block further comprises:
- a digital sync discriminator for generating a digital horizontal sync pulse in accordance with a horizontal sync pulse in the incoming video signal when the video signal is present;
- a pixel counter responsive to the digital horizontal sync pulse for counting pixels; and
- a state machine for controlling the pixel counter and for initiating the transition among normal, flywheel and free-running operation.

21. The apparatus according to claim 19 wherein the counter block further comprises:
- a line counter for counting lines within the incoming video signal; an
- a line counter state machine for controlling the operation of the line counter.

22. The apparatus according to claim 19 wherein the counter block further comprises:
- a frame counter for counting frames within the incoming video signal; and
- a frame counter state machine for controlling the operation of the frame counter.

* * * * *